United States Patent Office.

CHARLES HAVARD AND MANUEL X. HARMONY, OF LONDON, ENGLAND.

Letters Patent No. 90,944, dated June 8, 1869.

IMPROVED PROCESS OF PRESERVING MEAT, FOWLS, FISH, &c.

The Schedule referred to in these Letters Patent and making part of the same.

*To all whom it may concern:*

Be it known that we, CHARLES HAVARD and MANUEL X. HARMONY, both citizens of the United States of America, and residing at present in London, have jointly invented a new and improved Mode of Preserving Meat, Fowls, Fish, Fruit, and other Animal or Vegetable Matters; and we do hereby declare and make oath that the following is a full and exact description thereof.

The nature of our invention consists in extracting the air from the above-named substances, and when so, to impregnate and coat the same with a solution of gelatine, as hereafter described.

To enable others skilled in the art to make and use our invention, we will proceed to describe its operations.

We place in an air-tight vessel or compartment the meat, or other substance to be preserved, and draw therefrom, by means of a vacuum-pump, or otherwise, all the air, as completely as possible, and continue this operation for some time.

Then we use a solution of gelatine, (made of animal or vegetable matter,) to which we add bisulphite of lime, and force this mixture, by means of a force-pump, or otherwise, without allowing any access of air into the meat, or other substance contained in the air-tight vessel, or compartment.

When the meat is completely saturated, it is taken out and dipped into a concentrated solution of gelatine, containing bisulphite of lime, and also some glycerine, sugar, or gum.

The first solution is for filling up the cavities, or interstices of the meat, or other substances, while the air is exhausted therefrom, and is a combination of gelatine and bisulphite of lime in a diluted state.

The second solution is of the same combination as above named, with an addition of some glycerine, sugar, or gum, but in a more concentrated state, in which the meat, &c., is dipped, after having been thoroughly penetrated by the first solution, as above stated, and will form, when dry, a thick outside coating.

What we claim as our invention, and desire to secure by Letters Patent, is—

To preserve meat, fowls, fish, fruit, &c., by extracting therefrom the air, and when so, impregnate it with the gelatine, as above described, using for that purpose the aforesaid process and substances, or any others substantially the same, and which will produce the intended effect.

London, September 19, 1868.

C. HAVARD.
M. X. HARMONY.

Witnesses:
T. W. FRIGOUT,
F. W. ATKINSON.